Figure 1:
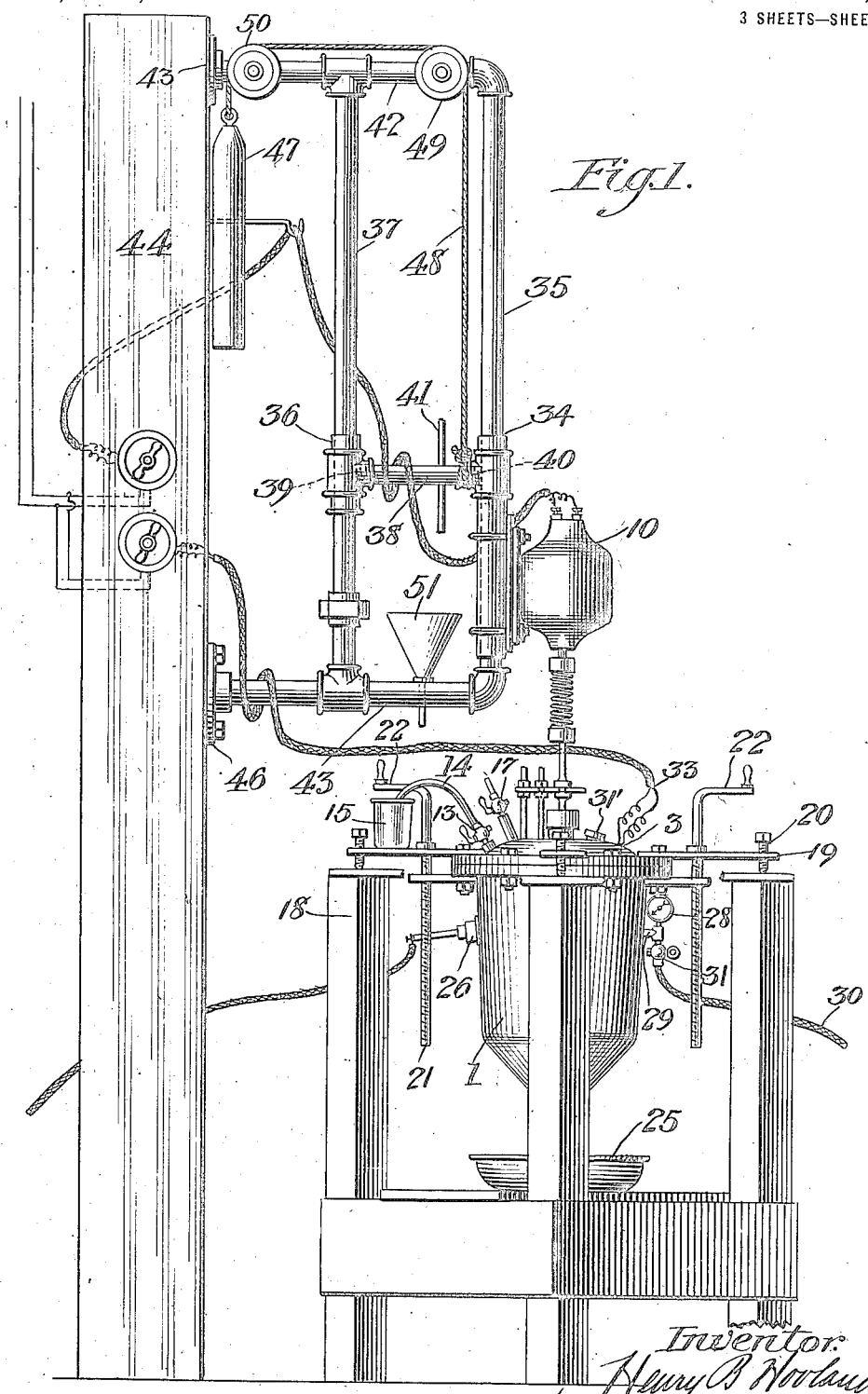

H. B. HOVLAND.
APPARATUS FOR TREATING ORES AND OTHER MATERIALS.
APPLICATION FILED JUNE 3, 1915.

1,164,188.

Patented Dec. 14, 1915.
3 SHEETS—SHEET 1.

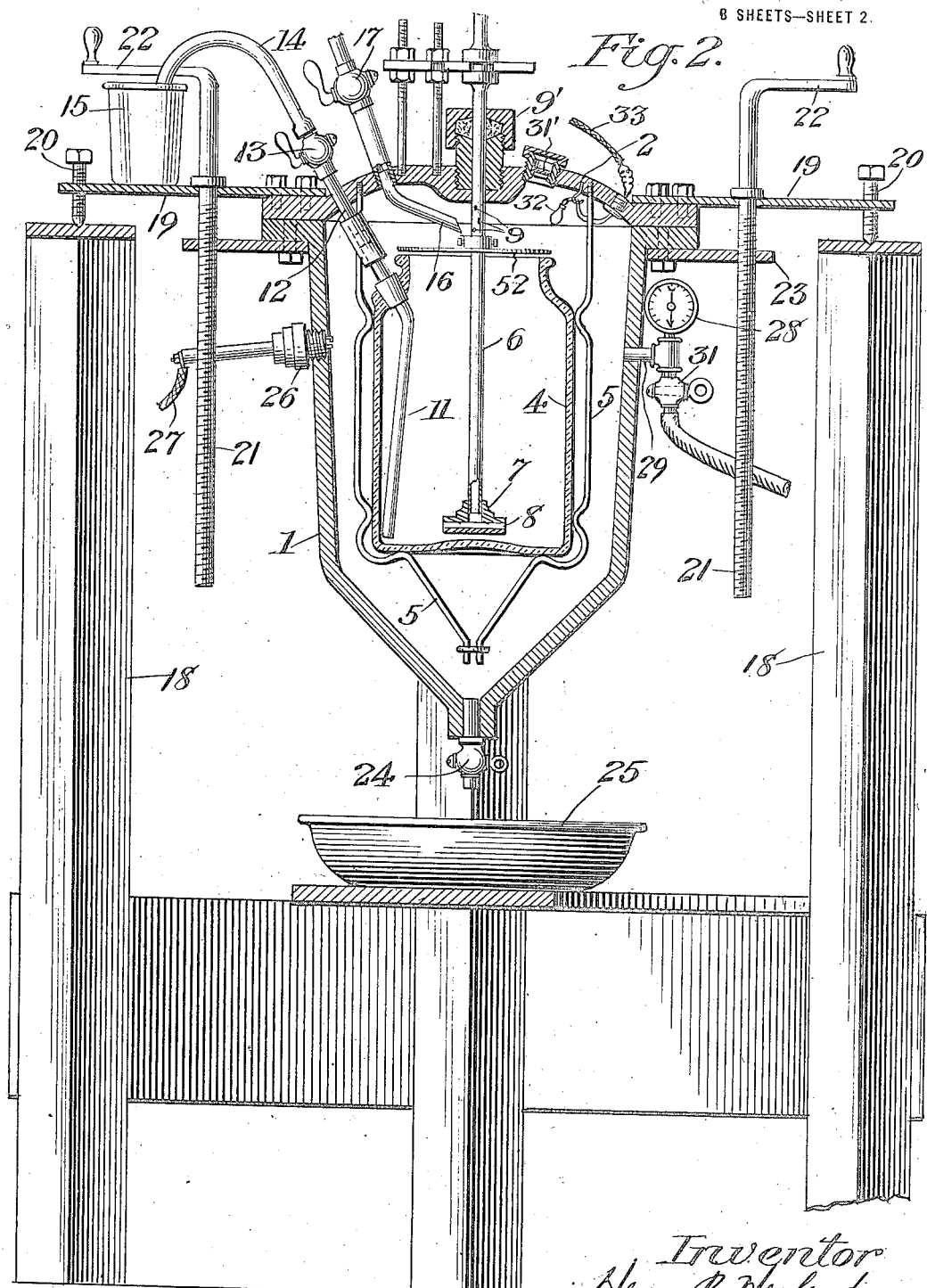

H. B. HOVLAND.
APPARATUS FOR TREATING ORES AND OTHER MATERIALS.
APPLICATION FILED JUNE 3, 1915.
1,164,188.
Patented Dec. 14, 1915.
3 SHEETS—SHEET 3.
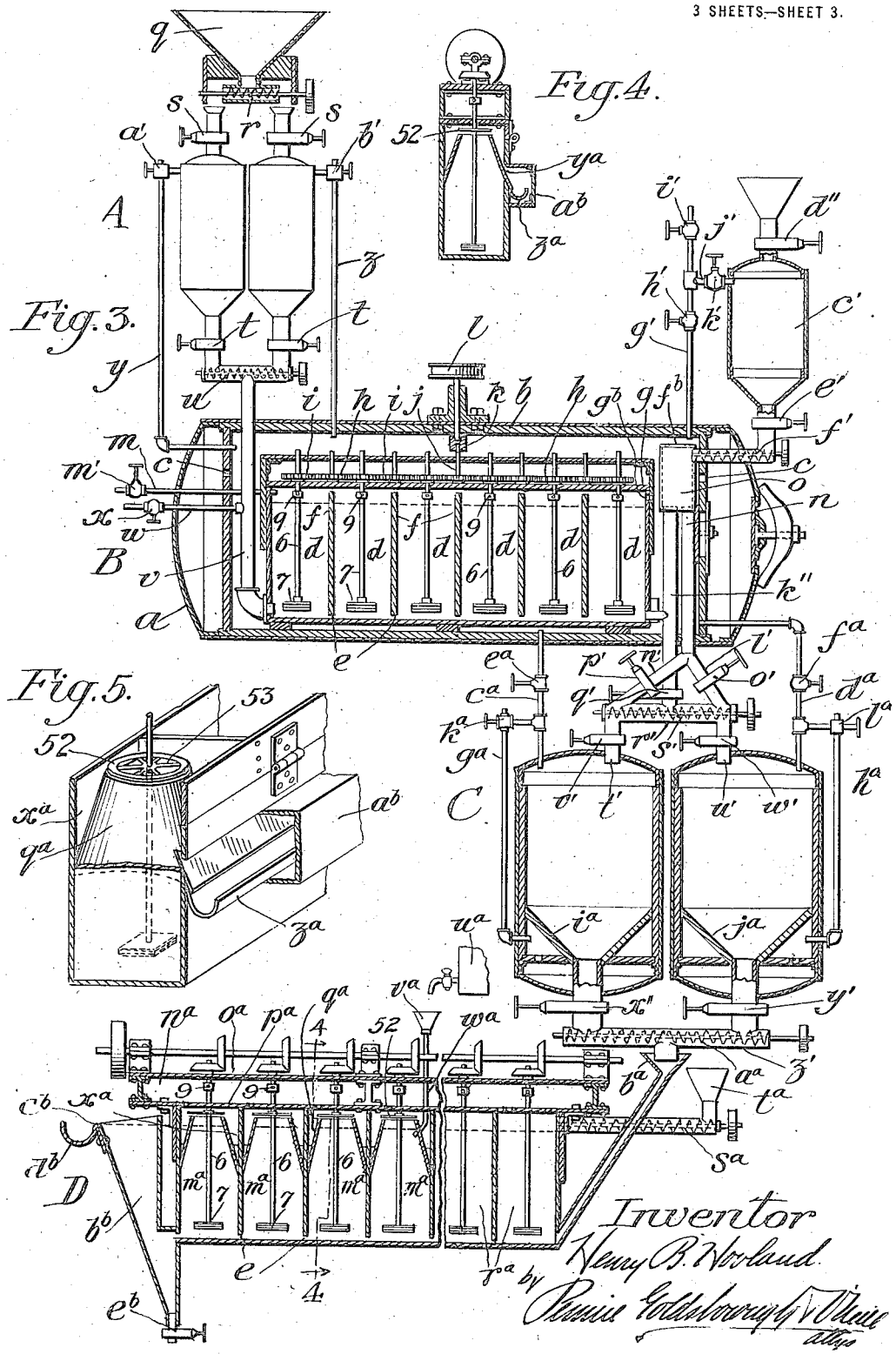

UNITED STATES PATENT OFFICE.

HENRY B. HOVLAND, OF DULUTH, MINNESOTA.

APPARATUS FOR TREATING ORES AND OTHER MATERIALS.

1,164,188.  Specification of Letters Patent.  Patented Dec. 14, 1915.

Application filed June 3, 1915. Serial No. 31,898.

*To all whom it may concern:*

Be it known that I, HENRY B. HOVLAND, a citizen of the United States, residing at Duluth, county of St. Louis, and State of Minnesota, have invented certain new and useful Improvements in Apparatus for Treating Ores and other Materials; and I do hereby declare the following to be a full, clear, and exact description of the invention, such as will enable others skilled in the art to which it appertains to make and use the same.

This invention relates to apparatus for treating ores and other materials in a wet or liquid condition, and has for its object to provide apparatus especially adapted for treating ore by the flotation process and for wet sulfating under superatmospheric pressure.

The invention consists in providing an inclosed container or casing adapted to contain the ore pulp or other material to be treated in a liquid state and to which is admitted certain fluid reacting constituents for treating the material in the container or casing. Means is provided for maintaining a circulation of the fluid in the container or the casing through the treated material. When the apparatus is used for the flotation process of treating ores, a novel form of skimmer is associated with the container or casing to skim the froth produced by the circulation of the fluid through the ore pulp. When the apparatus is used for sulfating, the means for maintaining the circulation of fluid through the material to be sulfated serves to bring into intimate contact with all parts of the material, the fluid constituents intended to act upon the same. In some instances, especially when used for sulfating, it is desirable to so construct the apparatus that the fluid maintained in circulation through the material to be sulfated is under superatmospheric pressure, as it has been found that sulfating under superatmospheric pressure greatly promotes the reactions as emphasized in the co-pending application above referred to.

Two forms of the apparatus are illustrated in the accompanying drawings, one form being designed especially for laboratory use and the other form designed for commercial use.

In the drawings: Figure 1 is a side elevation of an apparatus constructed for laboratory use; Fig. 2 is a vertical section of the apparatus shown in Fig. 1; Fig. 3 is a vertical section of an apparatus involving the same principles of operation as that shown in Figs. 1 and 2, but constructed for commercial purposes; Fig. 4 is a vertical section taken on the line 4—4 of Fig. 3; and Fig. 5 is a broken detail perspective view of one of the containers in which the flotation process is carried out.

Referring to Figs. 1 and 2, it will be seen that the apparatus when constructed for laboratory purposes, comprises an outer metallic casing 1 having a cover 2 rigidly bolted thereto by means of the bolts 3, in order to render the casing capable of withstanding relatively high internal pressure. Suspended within the casing 1 is a container 4, preferably in the form of a glass jar having a square cross section. The container 4 is suspended by means of metallic hangers 5 secured to the cover 2 and depending within the casing.

Projecting into the interior of the container 4 is a hollow rotatable stem 6 closed at its upper end and carrying at its lower portion, an agitator 7. The specific construction of the agitator 7 need not be herein described, as it constitutes the subject-matter of one of my co-pending applications, but it should be noted that the head of the agitator is provided with radial passages 8 capable of supplying to the contents of the container, air or other medium drawn through the openings 9 in the stem and down through the hollow stem 6, as will be hereinafter more fully described. The stem 6 passes upwardly through a stuffing box 9' associated with the cover 2 and is connected at a suitable point above the casing with an electric motor 10.

Passing through the wall of the container 4 is a tube 11, which extends nearly to the bottom of the container. At a point outside of the container, the tube 11 is connected with a tube 12 extending through the cover 2 and provided with a valve 13. The tube 12 is connected to a flexible tube 14 which is adapted to discharge into a sampling beaker 15, or is adapted to be connected to the source of material supply or to a source of fluid supply. A second tube 16 extends through the cover 2 and projects over the opening of the container 4. This tube is provided with a controlling valve 17.

The entire apparatus above described, with the exception of the motor, is mounted upon a suitable supporting structure denoted generally by the reference character 18. For this purpose, transverse supporting members 19 are bolted to the cover 2 and bear upon the supporting structure 18, as clearly shown in both Figs. 1 and 2. Leveling screws 20 may serve to support the members 19 on the supporting structure 18, if so desired.

When it is desired to disassociate the cover 2 from the casing 1, the bolts 3 are loosened and then the rotatable threaded hangers 21 are rotated by means of the handles 22 and the casing 1 is lowered through the intermediary of the radially-extending portions 23 secured to the casing 1 and having threaded engagement with the hangers 21. The hangers 21 are rotatably mounted in the supporting members 19, so it will be obvious that rotation of the hangers produces relative movement between the casing and its cover.

In one side of the casing is positioned an electric arc-producing plug 26 supplied with current through a suitable electric conductor 27 and at the other side of the casing is positioned a combined pressure and vacuum gage 28 communicating with the interior of the casing through the pipe 29. The pipe 29 communicates with a tube 30 controlled by means of a valve 31.

If desired, the cover 2 may be provided with a sight glass 31' through which the operations in the casing may be viewed. An electric bulb 32 may be positioned in the casing 2, illuminating its interior, and may be connected by means of the electrical conductors 33 to a source of current supply.

The motor 10, above referred to, is preferably mounted upon a sleeve 34, which, in turn, is slidably mounted upon one of the uprights 35 of a supporting frame. A second sleeve 36 is slidably mounted upon a second upright 37, and the two sleeves 36 and 34 are interconnected by means of a cross member 38, so that the said sleeves and the cross member 38 may slide in unison upon the uprights 35 and 37. Each of the extremities of the cross member 38 has threaded engagement with the adjacent sleeve, as shown at 39 and 40, respectively. When the cross member 38 is rotated in either direction, the threaded extremities 39 and 40 will cause a longitudinal movement of the cross member in one direction or the other, thereby causing one of the extremities of the cross member to bind against either the upright 35 or 37, thereby locking the whole slidable frame, comprising the sleeves 34 and 36 and the cross member 38, in place. To facilitate the rotation of the cross member 38, a suitable handle 41 may be provided. It will be noted from Fig. 1 that the uprights 35 and 37 are supported by means of the transverse members 42 and 43 rigidly secured to the supporting structure 44, at 45 and 46, respectively. The lower transverse member 43 serves to support a filling funnel 51, to which the tube 14 may be connected, as hereinafter described. In order to facilitate the movements of the frame to which the motor 10 is attached, the weight of said frame and motor may be counterbalanced by means of a counterweight 47, connected to the frame by means of a rope or cord 48 passing over the pulleys 49 and 50.

In employing an apparatus as above described, for sulfating purposes, the tube 16 is first connected to a vacuum pump and a partial vacuum created in the casing 1. The flexible tube 14 is then connected with the funnel 51. The valve 17 is then closed and the comminuted ore or other material to be sulfated, which has been previously mixed with the desired quantity of water, is poured slowly into the funnel 51. The valve 13 is then opened to permit the pulp poured into the funnel to be drawn into the container 4. Next the valve 13 is closed and the flexible tube 14 is connected to a source of supply of some sulfur-yielding substance, such as sulfurous acid. The valve 13 is then opened to admit the desired quantity of the sulfurous acid. Before the sulfurous acid is introduced, however, the motor 10 is set in operation to rotate the agitator 7, which is preferably made to turn at about 1800 revolutions per minute. The tube 16 is then connected with a source of air supply under pressure, or any other medium containing oxygen chemically available for reaction. When the valve 17 is opened, it is obvious that the available oxygen is supplied to the casing under superatmospheric pressure, the pressure preferably being in the vicinity of 30 to 100 lbs. to the square inch.

As the beater or agitator 7 is rapidly rotated, it impels the pulp with which it comes into contact outwardly, causing a partial vacuum to be created in the vicinity of the beater. This draws the available oxygen and any other gases present in the casing through the openings 9 and down through the hollow stem 6. The gases are then delivered through the openings 8 in the agitator head to the pulp and pass upwardly therethrough in the form of bubbles. The oxygen not absorbed and utilized for reaction in its travel through the pulp escapes from the top of the container 4 and is again drawn downwardly through the openings 9 and the hollow stem 6. In this way, a circulation of the oxidizing medium is maintained through the pulp and the agitator while said medium is under superatmospheric pressure. As the oxidizing agent passes through the pulp in the presence of sulfurous acid, the chemical reactions take place which result in the sulfating of the metallic values of the ore or the sulfating of any other material treated.

As the oxygen is consumed through reaction, the valve 31 is partially opened to permit bleeding, which results in fresh air or available oxygen in other form passing into the casing through tube 16 and valve 17. By thus leaving the valve 31 partially open and the valve 17 open, and by connecting the tube 16 to a source of oxygen supply under constant pressure, it is obvious that the desired pressure may be maintained in the casing 1 and still have a constant supply of fresh available oxygen.

Samples may be taken from the apparatus at intervals by closing the valve 17 and reducing the pressure in the casing through the valve 31 to about 5 pounds above atmospheric pressure, and then while the agitator 18 is still in operation, opening the valve 13, thus permitting the required amount of sample to be forced through the flexible tube 14 into the sampling beaker 15. After the sample has been obtained, the valve 13 is closed and the valve 17 again opened, whereby the pressure is again raised to the original point. It is obvious that if the sample taken indicates a deficiency of sulfurous acid, or any other ingredients used, they may be supplied through the tube 14.

The reaction may be augmented by means of any suitable catalyst, such as sodium chlorid and the like. In the present instance, an electric arc produced by the plug 26 serves to generate oxids of nitrogen for this purpose. When the reaction is completed and it is desired to remove the charge, valve 17 is closed and the pressure in the casing is reduced through valve 31 to about 5 pounds above atmospheric pressure. The valve 31 is then closed and the valve 13 opened, thus permitting the charge, while being agitated through the continued rotation of the agitator, to be forced out through the flexible tube 14 into a suitable vessel provided for the purpose of collecting the charge. It is obvious that wash water may be introduced in the container 4 to clean out the last portion of the charge, if so desired. The valve 24 is for the purpose of draining the casing 1 when the same contains any material to be discharged and the receptacle 25 receives the material discharged through the valve 24.

When the apparatus is used for the flotation process, a skimmer, shown at 52, is employed. The skimmer is shown in perspective in Fig. 5, and in Fig. 2 is shown as being secured to the stem 6 of the agitator just above the top edge of the open-top container 4. The skimmer 52 may be of any desired form, just so it rotates over practically the entire opening of the container 4 to skim the froth emerging therefrom. It preferably takes the form, however, of a wheel shown more clearly in Fig. 5 having a plurality of radial spokes 53.

The ore pulp may first be sulfidized and have added thereto a small quantity of oil, and then placed in the container for flotation, or the sulfidizing agent and the oil may be admitted through one or both of the tubes projecting into the casing. The treatment of the ore pulp to sulfidize the same and the addition of the oil to facilitate floating of the sulfid particles is well understood by those familiar with the metallurgical art, it being sufficient, in the present instance, to note that the agitator 7 violently beats the pulp and circulates air or other gaseous medium through the pulp in the form of very small bubbles, the air of which adheres to the oil coated particles and causes the same to float, producing a froth at the mouth of the container. The radial spokes 53 of the skimmer strike the froth and send it radially in substantially a horizontal direction against the walls 1 of the outer casing. It then passes to the bottom of the casing, where it may be drained through a valve 24 into a suitable receptacle 25.

The substantially square cross section of the container 4 prevents whirling of the ore pulp, and, therefore, prevents the formation of a vortex, the apex of which is in the vicinity of the bottom of the container. It is difficult to skim froth from such a vortical liquid surface, but, in the present instance, a level surface is presented to the skimmer from which the froth is obviously effectively removed. The formation of the vortex is necessary, however, in some types of apparatus, as this is depended upon to admit air to the pulp in the vicinity of the agitator head. In the present instance, the air is positively circulated through the interior of the agitator stem and the agitator head, and then through the body of the pulp so that the vortex is not necessary for the aeration of the pulp.

For the flotation process, it is obvious that the outer casing 1 need not be employed for maintaining a pressure around the pulp, as the flotation process may be carried out under superatmospheric pressure. However, it is sometimes desirable to subject the pulp to superatmospheric pressure and pass air under superatmospheric pressure through the pulp, and then subsequently greatly reduce the pressure, so as to bring the sulfid particles to the surface. In this event, it is obvious that the outer casing 1 may be valuable and either or both of the tubes associated therewith may serve to increase or reduce the pressure.

When constructed for commercial purposes, the apparatus is modified, as shown in Figs. 3 to 5, inclusive. In this form, the vessel or containers for holding the ore pulp or other material is duplicated to increase the capacity of the apparatus. Referring to Figs. 3 to 5, it will be seen that the commercial apparatus comprises, in the form illustrated in the drawing, four units, A indicating a pair of ore locks, from which ore is fed to the second unit, denoted generally by B and constituting that portion of the apparatus in which the sulfating takes place. C indicates a pair of ore locks for receiving the sulfated material from the unit B and feeding the same to the fourth unit D in which the flotation takes place.

Both the units B and D may be constructed along the same lines as the laboratory apparatus above described, that is, they may involve an outer casing adapted to withstand high internal pressures and an inner container for holding the ore pulp, it being understood, however, that in the commercial apparatus, the inner container is divided by partitions to form in effect a plurality of containers. In the form of the apparatus illustrated, only the sulfating unit B is provided with the outer casing just mentioned, as it is possible to subject the ore pulp to the flotation process without placing the apparatus in a pressure casing.

The sulfating unit B comprises an outer casing $a$ corresponding to the outer casing 1 of the laboratory apparatus, and having a protective lining preferably made of wood, and indicated at $b$. Certain parts of the lining $b$ which are spaced from the outer casing $a$ are provided with openings $c$ to equalize the pressure on both sides of the lining.

Positioned within the casing $a$ are a plurality of containers $d$ adapted to hold the ore pulp under treatment, and all of which are in communication by means of openings $e$ located blow the dividing partitions $f$. The entire series of containers is covered by a closure $g$ just below which the containers $d$ are in communication by means of the openings $h$ at the upper ends of the partitions $f$.

Each container has positioned therein, an agitator 7 similar to that shown in Fig. 2 and having a stem 6 passing upwardly through the closure $g$, above which all of the stems of the agitators are intergeared by means of the meshing gears $i$. Any one of the gears $i$ may be driven to rotate all of the agitators, but, in the present instance, the stub shaft $j$, to which the intermediate gear is connected, is driven through the intermediary of a universal joint $k$ from a driving pulley $l$. The stems of the agitators are provided with openings 9 positioned between the surface of the pulp in the containers and the closure $g$.

Water is admitted to the containers $d$ through an inlet pipe $w$ controlled by a valve $x$. When it reaches the level indicated by the dotted line, it overflows into a discharge pipe $n$ after passing upwardly into the reservoir $o$ through the conduit $k''$. The reservoir $o$ is provided with a perforated closure $f^b$. It is obvious that the reservoir $o$ serves to maintain a constant level of the liquid in the containers.

The ore is fed in comminuted form from the ore locks A to which the ore is admitted from a bin $q$. The ore is discharged from the bin $q$ by means of a feed conveyer $r$, which may be rotated in either direction to discharge into either the right or left-hand ore lock. Gate valves $s$ control the feed opening of the ore locks and similar gate valves $t$ control the discharge outlets thereof. A compound feed conveyer $u$, always rotated in the same direction, serves to feed ore from either of the ore locks downwardly through the feed pipe $v$ into the end container $d$.

The fluid reacting constituents, such as sulfurous acid and air, may be admitted in the form of a mixture through the pipe $m$ controlled by a valve $m'$. The sulfurous acid and air are admitted under superatmospheric pressure to promote the chemical reactions, and, therefore, pressure-equalizing pipes $y$ and $z$ serve to connect the pressure casing $a$ with the upper portion of the ore locks A to subject the ore in the ore locks to the same pressure which exists in the casing $a$. The pressure-equalizing pipes $y$ and $z$ are controlled by means of three-way valves $a'$ and $b'$, respectively.

Associated with the discharge end of the pressure casing $a$ is an auxiliary bin $c'$, the inlet opening of which is controlled by means of a gate valve $d''$ and the discharge outlet of which is controlled by means of a similar gate valve $e'$. The purpose of the bin $c'$ is to hold any suitable materials which it may be desirable to admit to the sulfate liquor in the unit B to place the same in proper condition for a subsequent sulfidizing in the unit D. The material may be fed from the bin $c'$ directly into the reservoir $o$ by means of a feed conveyer $f'$. A pipe $g'$, controlled by the two valves $h'$ and $i'$ communicates with the bin $c'$ by means of a branch pipe $j'$, which, in turn, is controlled by a third valve $k'$. It is, therefore, possible, by opening the valves $h'$ and $k'$ and partially opening the valve $i'$, to make the pressure in the bin $c'$ equal to the pressure in the pressure casing $a$. The valve $i''$, when left partially open, serves as a bleeder valve to exhaust the used gases from the pressure casing $a$. This, however, need not reduce the pressure in the casing $a$, as the pipe $m$ for admitting the sulfurous acid and air, may be connected to a supply of these constituents under constant pressure, and when the valve $m'$ is left open and the bleeder valve $i''$ left partially open, it is obvious that the pressure in the casing $a$ will be maintained constant. By closing valves $h'$ and $e'$ and opening valve $k'$, it is obvious that the pressure in the bin $c'$ may be released through the valve $i'$.

The sulfate liquor overflowing into the conduit $n$ passes downwardly into two branch conduits $l'$ and $n'$ controlled by means of the valves $o'$ and $p'$, respectively. The sands discharged from the bottom of the last container $d$ pass downwardly through the pipe $k''$ and are admitted by means of a valve $q'$ to a branch conduit $r'$, in which a compound conveyer $s'$ conducts the sands to either the right or left-hand end of the branch conduit $r'$. The branch conduit $r'$ at its end portions communicates with the branch conduits $l'$ and $n'$ for conducting the sulfate liquid, and, therefore, the sands mix with the liquor and are conducted either to the right or left-hand ore lock C through either the inlet pipe $t'$ or $u'$ controlled by means of the valves $v'$ and $w'$, respectively.

The discharge opening of the ore locks C are controlled by means of gate valves $x'$ and $y'$. The ore locks C discharge into a common conduit $z'$ from which the material is conducted by means of a compound conveyer $a^a$ into a bin or other receiver $b^a$ from which the material is fed to the flotation unit D.

The pressure in the ore locks C may be equalized with the pressure in the casing $a$ by means of connecting pipes $c^a$ and $d^a$ controlled by the valves $e^a$ and $f^a$, respectively. Branch pipes $g^a$ and $h^a$ serve to equalize the pressure under the bin floors $i^a$ and $j^a$ with that above the same. Three-way valves $k^a$ and $l^a$ are provided to place the interior of the ore locks C in communication with the atmosphere, to thereby reduce the pressure therein.

Instead of using the same portion of the apparatus for both sulfating and floating, it is, of course, desirable for commercial purposes to discharge the sulfated material into a separate flotation apparatus, so as to make the process continuous. For this reason, the flotation unit D has been added in Fig. 3 and is constructed somewhat similar to the unit B, except that the pressure-casing $a$ has been omitted, but, as above stated, the pressure-casing may be used around the flotation unit also. The flotation unit D comprises a plurality of containers $m^a$ into which project the agitator 7. In the flotation unit, instead of the fluid medium being drawn through openings in the agitator stem positioned just above the level of the liquid, it is drawn through openings positioned in a compartment $n^a$ formed above the containers by means of two partitions $o^a$ and $p^a$, the latter of which is perforated to permit the gaseous fluid, such as air, after being circulated through the pulp, to again rise into the compartment $n^a$. Associated with each of a certain number of containers $m^a$ near the discharge end of the apparatus is a tapering neck portion $q^a$, best shown in Fig. 5, and immediately above the opening of said neck portion is positioned the rotary skimmer 53 similar to that described in connection with the laboratory apparatus. The skimmers are secured to the agitator stems and rotate therewith. The first few containers are not provided with the tapering neck portion $q^a$ or the skimmers, as these containers, indicated at $r^a$, serve merely as mixing chambers to mix with the pulp a sulfidizing agent admitted by means of the conveyer $s^a$ from a bin or other receptacle $t^a$. Oil is admitted to one of the containers $m^a$ from a suitable reservoir $u^a$ by means of a funnel $v^a$ and the conduit $w^a$.

The froth emerging from the openings of the neck portions $q^a$ is thrown against the walls of the containers proper and drops into the space existing at the base of the neck portions $q^a$ and the walls of the containers, these spaces being indicated at $x^a$. The froth is drained from these spaces through an opening $y^a$, best shown in Fig. 4, into a trough or launder $z^a$ running longitudinally of the series of containers. It is obvious that one of these troughs or launders may be provided at each side of the series of containers, if so desired, although only one is shown in the drawing. The trough $z^a$ is inclosed by means of a box-like closure $a^b$ (Figs. 4 and 5), the interior of which is in communication with the compartment $n^a$. It is obvious that by inclosing the trough $z^a$ and the opening $y^a$, the same air either under atmospheric pressure or superatmospheric pressure in the compartment $n^a$ may be used over and over again, as it circulates down through the openings 9 in the agitator stems, and then upwardly through the containers back into the compartment $n^a$.

The containers are in communication at their lower portions by means of openings $e$ similar to the openings $e$ shown in connection with the sulfating unit B and serve to permit the ore pulp to flow from one container to the other. After the pulp has been subjected to treatment in as many containers as desirable, it is discharged into a spitzkasten $b^b$, the upper discharge edge of which, $c^b$, serves to maintain a constant level of liquid in the containers. The liquid discharged over this edge $c^b$ passes into a launder or trough $d^b$ and the gangue may be discharged through a valve $e^b$ located at the lower portion of the spitzkasten.

The operation of this form of the apparatus is as follows. Assuming that all the valves are closed, the ore or other material to be treated is thoroughly crushed and ground to pass an 80-mesh screen and is fed from the bin $q$ into either the right or left-hand ore lock A. Assuming that the material is fed first into the left-hand ore lock A, the gate valve $s$ associated therewith is opened and the conveyer $r$ is rotated in proper direction to feed the material into the left-hand ore lock. When the ore lock has been filled, the gate valve $s$ is closed and valves $v'$, $p'$ and $c^a$, controlling the communication between the unit B and one of the ore locks C, are opened and three-way valve $a'$ is so turned as to place the left-hand ore lock A in communication with the interior of the casing $a$ of the sulfating unit B. The valve $x$ of the unit B is then opened to admit water through the pipes $r$ into the containers $d$ until the proper level is reached and thereafter the valve $x$ is left open the proper amount to maintain a constant level of the liquid in the containers during the sulfating operation. The valve $m'$ is then opened to bring into the presence of the material in the containers, a mixture of sulfurous acid and air or other reacting agent or agents, such as smelter fumes. These fluid constituents are admitted until the pressure in the casing reaches approximately 100 lbs. to the square inch and thereafter the pipe $m$ is connected to a source of sulfurous acid and air supply under a constant pressure of about 100 lbs. to the square inch. The gate valve $t$ controlling the outlet from the left-hand ore lock A is then opened and the material is gradually introduced by means of the conveyer $u$ through the pipe $v$ into the containers $d$. The connecting pipe $y$ equalizes the pressure in the ore lock and in the casing $a$, thereby enabling the material to feed from the ore lock to the containers. The agitators 7 are then set in operation and the fluid reacting constituents in the containers and the casing are drawn down through the openings 9 and the hollow stems of the agitators and delivered to the material in the containers by the agitator head. The suction zone produced in the vicinity of each agitator head automatically draws the fluid constituents down into the liquid and circulates them through the liquid in the form of finely divided bubbles. The material to be treated, is, therefore, efficiently subjected to the action of the sulfating constituents under pressure. The used gases pass out of the opening $g^b$ and out of the casing $a$ through the valve $i'$, which, when the valve $h'$ is opened, may be left in such a position as to permit bleeding of the used gases in the casing $a$. The inlet valve $m'$ for the fresh reacting constituents is left open to effect a constant supply of fresh fluids and to maintain the desired pressure in the casing. By the time the material has circulated through all of the containers and has reached the last container $d$, it has been subjected a number of times to the action of the fluid reacting constituents, as in each container the fluid reacting constituents are circulated through the material in the container. By the time the last container is reached, therefore, the material is thoroughly sulfated and the sulfate liquor passes from the last container through the pipe $k''$ into the reservoir $o$, where it overflows into the pipe $n$ leading to the lock bins C.

The lock bin $c'$ may contain any suitable material for placing the material discharged in the sulfating unit B in proper condition for sulfidizing. When it is desired to add such material from the bin $c'$, the valve $h'$ is opened to equalize the pressures in the bin $c'$ and the casing $a$, thereby permitting the material in the bin $c'$ to be fed through the gate valve $e'$ by means of the conveyer $f'$ into the reservoir $o$. The bin $c'$ may be refilled by closing the valve $e'$ and reducing the pressure in the bin by closing the valve $h'$ and reducing the pressure through the valves $k'$ and $i'$.

The sulfate liquor overflowing into the pipe $n$ passes downwardly through the branch pipe $n'$ into the left-hand lock bin C. The sands pass into the pipe $k''$ from the bottom of the last container $d$ and pass downwardly to the valve $q'$ which is left partially open, so as to admit the sands to the cross conduit $r'$, but to prevent the greater part of the sulfate liquor from flowing directly to the bins C through the pipe $k$. The greater part of the sulfate liquor is, therefore, caused to rise in the pipe $k''$ and overflow into the pipe $n$, thereby maintaining a constant level of the liquid in the container $d$. The sands received by the cross conduit $r'$ are conveyed by the conveyer $s'$ until they meet and mix with the downcoming sulfate liquor. The mixture is then delivered to the left-hand lock bin C. The pressure in the left-hand lock bin C is made equal to the pressure in the casing $a$ through the connecting pipe $c^a$, thus permitting the material to feed into the lock bin. This process is continued until the left-hand lock bin C is filled, at which time, it will be assumed that the material to be treated has been completely discharged from the left-hand ore lock A. During the discharge of the material from the left-hand ore lock A, however, the right-hand ore lock A has been filled by reversing the direction of rotation of the conveyer $r$. The process may, therefore, be continued by equalizing the pressure in the right-hand ore lock A and the casing $a$ through the pipe $z$ in the same manner as described in connection with the left-hand ore lock, and then feeding material from the right-hand ore lock into the sulfating unit B. The pressure in the left-hand ore lock A may then be reduced by so turning the three-way valve $a'$ as to place the interior of the ore lock in communication with the atmosphere and to cut off communication between the interior of the ore lock and the casing $a$, thus permitting the feeding of more ore to the lock bin, as above described. It is obvious that the right-hand ore lock may be refilled in the same manner. As the left-hand lock bin C is now full, the valves $e^a$, $v'$ and $p'$ are closed and valves $o'$, $w'$ and $f^a$ are opened to permit feeding of the material into the right-hand lock bin C. The branch pipe $d^a$ controlled by the valve $f^a$ equalizes the pressure in the right-hand lock bin with that in the casing $a$ of the sulfating machine. The three-way valve $k^a$ associated with the left-hand lock bin C is then turned so as to place the interior of the bin in communication with the atmosphere, thereby reducing the pressure. After the gate valve $x'$ is opened, material may be fed by means of the conveyer $a^a$ from the left-hand lock bin into the flotation unit D. It is obvious that when the right-hand lock bin C is full and the left-hand one has been emptied, the pressure may be reduced in the right-hand bin in the same manner as that described above, and the material then fed into the flotation machine from the right-hand bin, during which time, the left-hand bin C may be again filled.

In the first few compartments $r^a$, the material is subjected to a thorough agitation to permit proper action of the sulfidizing agent admitted by means of the conveyer $s^a$ into the first container. By the time the material reaches the first of the flotation containers $m^a$, it is thoroughly sulfidized and the oil admitted from the reservoir $u^a$ into the first flotation container $m^a$ places the material in proper condition for flotation. The circulation of air through the material by means of the agitators 7 causes the sulfidized metal to rise to the surface of the containers in the form of a froth, where it is skimmed off by the action of the skimmers 52. The skimmers not only remove the froth by actual contact therewith, but their rapid rotation also serves to blow the froth from the top of the containers. The froth is then caught in the spaces $x^a$, previously described, and removed by means of the launder $z^a$.

The gangue and liquor are discharged from the last container $m^a$ into the spitzkasten $b^b$, the liquor being discharged from the spitzkasten into the launder $d^b$ and the gangue being removed from the bottom of the spitzkasten through the valve $e^b$.

It is obvious from the foregoing description of the commercial apparatus that the effect of supplying the various pressure-equalizing connecting pipes is the same as if all parts of the apparatus were placed in one casing capable of maintaining the parts of the apparatus under the same pressure. It is also obvious that the commercial form of the apparatus may be used for successively sulfating and floating, or may be used only for sulfating or only for floating. Furthermore, in practice, it may be desirable to use several sulfating units all discharging into a single flotation unit and probably desirable to cause several sulfating units to be supplied from the same ore locks containing the comminuted ore.

The commercial apparatus is represented in the drawing more or less diagrammatically and numerous accessories may be added and others changed without departing from the spirit of the invention. It is also obvious that the relative sizes of the units will be determined by the character of the material treated, as some ores sulfate readily requiring but little time in the sulfating machine, whereas other ores may take much longer for the reaction.

It will be noted that both forms of the apparatus involve the use of an inclosed container, means to agitate the material in the container so as to produce a circulation of the reacting constituents through the material, and means for skimming the froth produced by the agitation of the material. Furthermore, both forms of the apparatus involve the use of a container inclosed by a pressure casing with means associated with the apparatus for bringing fluid-reacting constituents under pressure into the presence of the material in the container and with means for discharging the waste fluids or waste gases from the apparatus.

It is obvious that many changes may be made in the details of construction of both the laboratory apparatus and the commercial form of the apparatus without departing from the spirit or scope of the invention as defined in the accompanying claims.

What I claim is:—

1. Apparatus for treating ores and other materials, comprising a casing adapted to withstand relatively high internal pressures, a container positioned within said casing adapted to contain the material to be treated in a liquid state, means to admit reacting constituents to the container, and means to maintain circulation of the gaseous fluid through the material in the container.

2. Apparatus for treating ores and other materials, comprising a casing adapted to withstand relatively high internal pressures, a container positioned within said casing adapted to contain the material to be treated in a liquid state, means for admitting the material to be treated to the container, and for bringing fluid reacting constituents into the presence of the material in the container, an agitator positioned in said container, and means associated with said agitator for maintaining a circulation of the gaseous fluid through the material in the container.

3. Apparatus for treating ores and other materials, comprising a casing adapted to withstand relatively high internal pressures, a container supported within the casing and adapted to contain the material to be treated in a liquid state, means for admitting the material to be treated to the container and for bringing fluid reacting constitutents into the presence of the material in the container, and means to maintain a circulation of the gaseous contents of the casing through the material in the container..

4. Apparatus for treating ores and other materials, comprising a casing adapted to withstand relatively high internal pressures, a container supported within the casing, a plurality of valved tubes passing through the outer casing through which the material to be treated may be introduced to the container and through which fluid reacting constituents brought into the presence thereof, and means to maintain a circulation of the gaseous contents of the casing through the material in the container.

5. Apparatus for treating ores and other materials, comprising a casing adapted to withstand relatively high internal pressures, a container supported within the casing and adapted to contain the material to be treated in a liquid state, means for admitting the material to be treated to the container and for bringing fluid reacting constituents into the presence of the material in the container, a rotary stem projecting through the casing into the interior of the container, and an agitator head secured to said stem to agitate the material in the container.

6. Apparatus for treating ores and other materials, comprising a casing adapted to withstand relatively high internal pressures, a container supported within the casing and adapted to contain the material to be treated in a liquid state, means for admitting the material to be treated to the container and for bringing fluid reacting constituents into the presence of the material in the container, a rotary stem projecting into the interior of the container, an agitator head secured to said stem to agitate the material in the container, and means associated with said stem and the agitator head for maintaining a circulation of the gaseous contents of the casing through the material in the container.

7. Apparatus of the kind described, comprising an outer casing, a container supported therein, a tube passing through one wall of the casing and projecting into the interior of the container, a valve outside of the casing for controlling the passage in said tube, a second tube projecting into the interior of the casing, a valve for controlling the passage therein, an agitator positioned in said container, and means for rotating the same.

8. Apparatus of the kind described, comprising a casing, a container supported in said casing having an opening in its upper portion and adapted to contain the material to be treated in a liquid state, means for admitting the material to be treated to the container and for bringing fluid reacting constituents into the presence of the material in the container, means for maintaining a circulation of the gaseous contents of the casing and container through the material in the container, and an electric arc-producing plug associated with the casing, for the purpose described.

9. Apparatus of the kind described, comprising a casing adapted to withstand relatively high internal pressures, a container supported in said casing and adapted to contain the material to be treated in a liquid state, means for admitting the material to be treated to said container and for bringing fluid reacting constituents into the presence of the material in the container, means for maintaining a circulation of the gaseous contents of the casing and container through the material in the container, and a bleeder valve associated with the casing to permit gradual escape from the casing and container of the gaseous contents thereof.

10. Apparatus of the kind described, comprising a casing adapted to withstand superatmospheric internal pressures and adapted to inclose a body of material to be treated, means to admit fluid under superatmospheric pressure to the casing, and an agitator positioned within the casing capable of maintaining a circulation of the fluid through the interior of the agitator and the material in the casing.

11. Apparatus of the kind described, comprising a casing adapted to withstand superatmospheric internal pressures and adapted to inclose a body of material to be treated, means to admit fluid under superatmospheric pressure to the casing, and means to produce a continuous and circuitous movement of the gaseous fluid in the casing through the material to be treated.

12. Apparatus of the kind described, comprising a casing, a container inclosed thereby adapted to contain the material to be treated in a liquid state, means for bringing fluid reacting constituents into the presence of the material in the casing, means for circulating the gaseous reacting constituents through the material, and means for discharging the waste gases from the apparatus.

In testimony whereof I affix my signature.

HENRY B. HOVLAND.